Oct. 30, 1956          R. BELLMANN          2,768,831
HOLDING DEVICE FOR TOOLS, PARTICULARLY
FOR HORIZONTAL BORING MACHINES
Filed Aug. 18, 1954
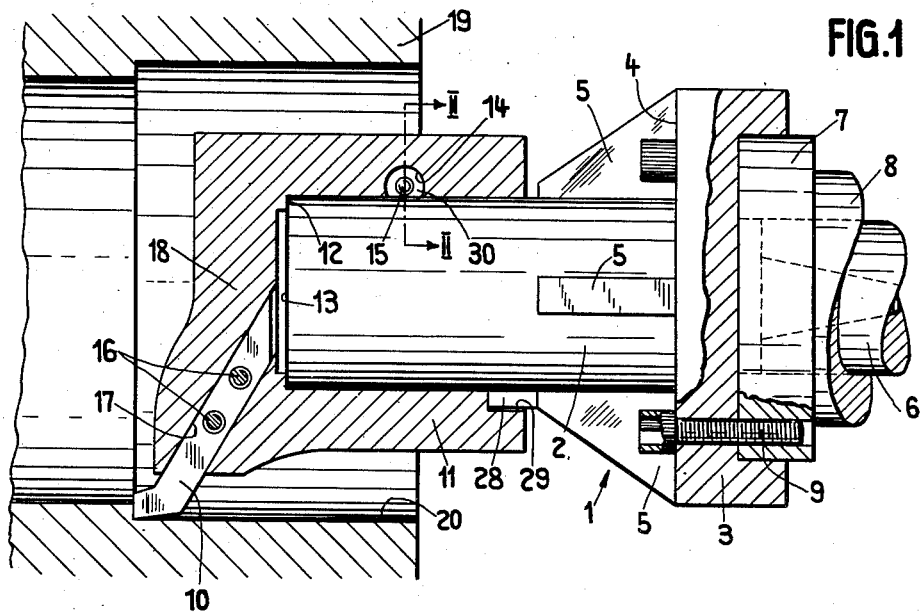
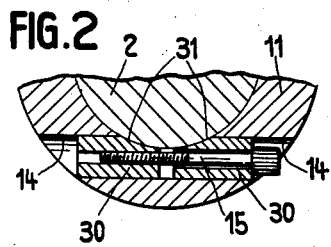
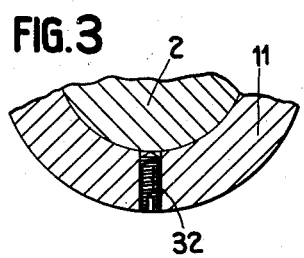
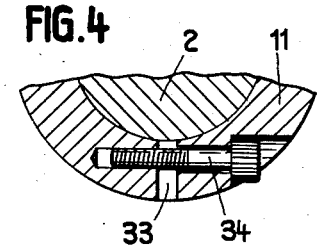
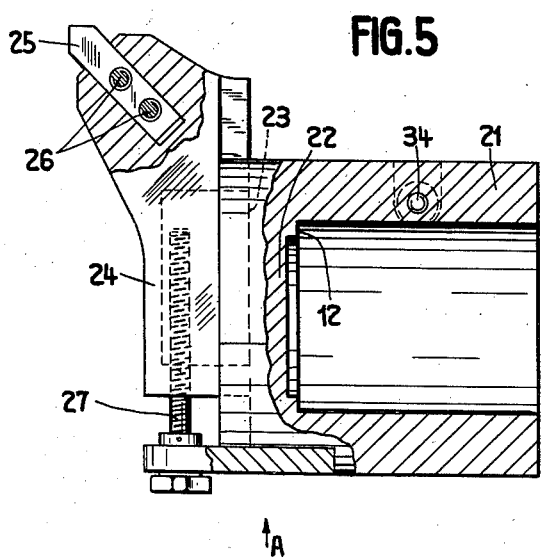
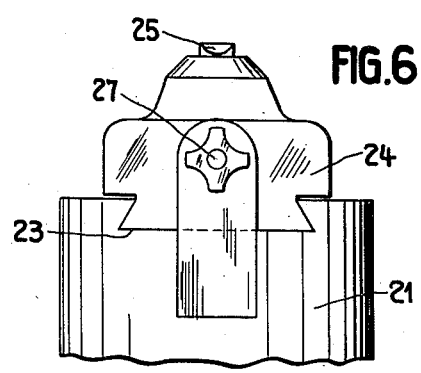
INVENTOR
REINHOLD BELLMANN
BY
Edward V Connors
ATTORNEY United States Patent Office 2,768,831
Patented Oct. 30, 1956

2,768,831

HOLDING DEVICE FOR TOOLS, PARTICULARLY FOR HORIZONTAL BORING MACHINES

Reinhold Bellmann, Le Locle, Switzerland, assignor to Dixi S. A., Le Locle, Switzerland Application August 18, 1954, Serial No. 450,732

Claims priority, application Switzerland August 28, 1953

5 Claims. (Cl. 279—6)

The present invention relates to a holding device for tools, particularly but not exclusively for horizontal boring machines having a hollow spindle.

With respect to such boring machines, precision machines are particularly concerned, with which the most varied boring and turning work, and, if required, also milling work, may be performed with a high degree of accuracy of 0.01 mm. and less, for example. Inside the hollow spindle, which is usually provided with a flange they have a boring spindle which can be axially displaced.

In the production of bore holes having a large diameter, a rather small hole must be previously bored when using such boring machines, for example, by means of a spiral borer, said hole being substantially bored out in several successive cutting depths with a cutting tool or boring out tool, whereupon the precision boring may now be effected. In order to avoid the time-wasting subsequent adjustment of cutting tools on the tool holder or carrier when passing over from one cutting depth to the other, the tools have already been permanently set fixed for a cutting operation on their holding device and the holding device made rapidly interchangeable from one cutting operation to the other by another holding device having a tool permanently set fixed for the new operation by the feature that the shaft of the device is provided on its neck with an outer cone which has been inserted in an inner cone of the bore spindle and in conjunction with suitable means, such as forcing screws, allows the holding devices to be rapidly exchanged. This rapid exchange is, for example, desirable between preliminary boring and boring out and boring out and precision boring and between other operations. However, such a cone attachment is no longer able to conform to the high requirements of accuracy, particularly for the production of bore holes having a fairly large diameter, and with larger cutting powers, as the rigidity obtained with this type of attachment is no longer satisfactory. The diameter of the inner cone of the boring spindle is limited by the outer diameter of the spindle and is appreciably smaller than the latter. Therefore, to improve the rigidity it is no use providing the cylindrical part of the shaft of the tool holder with a large diameter if the conical neck of this shaft is thinner than the cylindrical part of the shaft when adapting it to the often much smaller diameter of the inner cone of the boring spindle. This attenuation has a particularly unfavorable effect on rigidity and thus on accuracy in the production of deep bore holes, because the overhang of the bore spindle or the length of the rod-shaped shaft (bore rod) is very large in comparison with the diameter of the conical neck. Thus with this known overhung arrangement of the tools by means of cones the advantage of rapid interchangeability had to be exchanged for a loss of accuracy.

In the interest of accuracy the bore rod has already been mounted in a counter holder at the end turned away from the bore spindle as far as the form of the tool permitted and it did not concern blind bores. However, due to such a double support, rapid interchangeability of the overhung tools and convenient possibilities of measurements in the bore hole by running out the tool from it were lost. In addition the gain in rigidity was only slight, as doubly supported bore rods become particularly long and even large diameters of the cylindrical part thereof (of 70 mm., for example) are of no use, as the conical neck of the bore rod inserted into the inner cone of the bore spindle remains weak, even with the double support, relative to the cylindrical part. With the above diameter of 70 mm. the neck has a diameter of 41 mm., for example.

It is an object of the invention to provide a holder with a shaft capable of being mounted on the hollow spindle of the boring machine, for example, on the flange thereof, for increasing rigidity.

Another object of the invention is to ensure economic working.

A further object of the invention is to provide the device with two parts, one of which, the part carrying the tool may be slipped in the direction of the axis of the hollow spindle on the outer jacket surface of the other part secured to the hollow spindle and may be attached thereto in a quickly interchangeable manner. Owing to the feature that one part encloses the other, and therefore is larger in its outer dimension than the diameter of the other part, a guarantee is provided that the improvement in rigidity gained by the attachment of the device to the hollow spindle is not lost again between the one part forming the holder shaft and the other part forming the tool carrier. The device according to the invention has over the advantage having a conical shaft neck which may be inserted in the bore spindle, the further advantage that with a change in operation the whole device need not be interchanged but only a part thereof, whilst the remaining part may remain attached as long as possible during several operations. In addition, in spite of great rigidity all the advantages of the overhung arrangement of the tools are maintained.

The tool carrier can carry other tools apart from boring and/or turning tools, which must be rapidly interchanged.

Other objects and features will be apparent as the following description proceeds, reference being had to the accompanying drawings illustrating by way of examples two embodiments of the invention, and wherein Fig. 1 is an elevation of the first example, partly in longitudinal section through the axis of rotation.

Fig. 2 is a sectional view taken along the line II—II of Fig. 1, illustrating a rapid clipping device for securing the tool carrier to the shaft.

Figs. 3 and 4 are sectional views similar to Fig. 2 of two other performances of rapid clipping devices.

Fig. 5 shows the tool carrier of the second form of construction, partly in section, and Fig. 6 is an elevational view of the second form in the direction of arrow A in Fig. 5.

The holder 1 of the device has a powerful cylindrical shaft 2 and a powerful collar 3 connected to the latter. For increasing the rigidity between the parts 2 and 3 there run from the shaft-side face 4 of the collar 3 ribs 5 to the shaft 2. In Fig. 1 the collar 3 is slipped on the flange 7 of the hollow spindle 8 when the bore spindle 6 is drawn in. The collar 3 encloses the flange 7 on its periphery and is secured to the flange 7 by means of several screws 9. A tool carrier 11 carrying a boring or turning tool 10, forming a hollow cylinder and consisting of one piece, is so slipped on the shaft 2 that it encloses the shaft 2 on its periphery, that is to say, has a larger diameter than the shaft 2, so that great rigidity is ensured also between the parts 2 and 11. The base 18 closing the bore on the carrier 11 on one side forms a shoulder 12 which cooperates with the front 13 of the shaft 2 as a stop when the carrier 11 is slipped on. The extension 28 of one of the ribs 5 engages in a corresponding recess 29 of the carrier 11 and is used, together with the latter, to facilitate the fixing of the carrier 11, which, together with the correct axial adjustment automatically produced by the shoulder 12, further increases the speed of the exchange. The means 28, 29 are particularly advantageous in cases where a definite relative position between the parts 2 and 11 is important in the circumferential direction. The carrier 11 is secured by a known rapid clipping device as shown in Fig. 2 to the shaft 2 so as to be quickly interchangeable. The rapid clipping device of Fig. 2 has tensioning cylinders 30 with bearing surfaces 31, said cylinders 30 being mounted so as to be axially displaceable in a bore 14 of the carrier 11, the radius of curvature of the bearing surfaces 31 corresponding to half the diameter of the shaft 2. The tensioning cylinders 30 are interconnected by a screw bolt 15 and can be approached to each other by the rotation thereof so that the bearing surfaces 31 are firmly pressed against the shaft 2. In order to rapidly detach the carrier 11 from the shaft 2, the bolt 15 is turned in the other direction so that the tensioning cylinders 30 are moved away from each other and the pressure between bearing surfaces 31 and shaft 2 is removed. Instead of the rapid clipping device of Fig. 2, such a device as shown in Fig. 3, having a pressure screw 32 of known type screwed in the carrier 11, radially operating on the shaft 2, could be used, or, as shown in Fig. 4, the carrier 11 could be slotted axially as at 33 and, for securing to the shaft 2, be elastically contracted in its circumferential direction in known manner by a screw bolt 34 or a nut. The cutting tool 10, arranged overhung in the described device, is held in known manner by means of pressure screws 16 in a long guide 17 disposed in the powerful, that is to say, very rigid, base 18 of the carrier 11 and thus adjusted fixed once and for all for a single operation of the entire machining.

The diameters of the shaft 2 and of the carrier 11 are limited only by the diameter of the bore hole 20 to be produced on the work-piece 19. These diameters and thus the rigidity of the device may therefore be selected correspondingly to the hole to be made.

During all the operations of a single machining process or a series thereof, the parts 2 and 3 may remain firmly clamped on the hollow spindle 3 and from operation to operation only the various tool carriers 11 with their tools on the shaft 2, adjustedly fixed from the start for the different operations, need be exchanged.

The tool carrier 11 may of course be arranged to receive any other tools desired than the cutting tool 10, thus for example, as a clamping chuck for spiral borers or, for example, for receiving measuring and checking devices.

Whilst the tool carrier 11 in Fig. 1 is substantially a single member, that in Figs. 5 and 6 has two portions. The hollow cylindrical part 21 of the carrier may be secured to the shaft 2 shown in Fig. 1 so as to be interchangeable rapidly in the same manner as the carrier 11 in Fig. 1. It then encloses also the shaft 2 on the outside. The powerful base 22 of the part 21 has in known manner a straight guide 23 for a slide member 24 vertically adjustable to the axis of rotation of the device, on which a tool 25 is firmly clamped by means of pressure screws 26. The powerfully constructed slide member 24 can be displaced along the guide 23 by an adjusting screw 27. The slide member 24 may have any other shape desired, for example, adapted to the type of tool used and/or there may be provided a hand or mechanically actuated device for intermittent and/or continuous adjustment of the slide member 24. With such tool carriers consisting of two parts, plane surfaces or grooves, for example, may be produced.

The remaining parts not shown in Figs. 5 and 6 of the holding device correspond to the parts 2, 3, 5 of Fig. 1.

The shaft 2 may be conical on its outer jacket surface towards its free end, whilst the carrier 11 or the part 21 respectively then has a corresponding inner cone.

While the invention has been described and illustrated with reference to specific embodiments thereof it will be understood that other embodiments may be resorted to without departing from the invention. Therefore, the form of the invention set out above should be considered as illustrative and not as limiting the scope of the following claims.

What I claim is:

1. An adapter for fixing a tool to a rotatable hollow spindle having an end flange integral with and of larger diameter than the spindle, the adapter comprising a collar having a recessed end adapted to be received over the end flange of the spindle, means to secure the collar to the spindle, a shaft rigidly attached to the collar extending outwardly therefrom and coaxial therewith, the shaft having an outwardly facing circular end, reinforcing ribs rigidly connecting the collar and the shaft, a tool holder having a cylindrically-shaped recess to receive the outer end of the shaft, means forming a shoulder at the inner end of the recess in the tool holder providing bearing means for the end of the shaft, the shoulder of a predetermined thickness to determine the distance of axial extension of the tool carrier relative to the position of the cylindrical shaft, and securing means mounted on the tool holder for lateral movement with respect thereto for quickly securing and disengaging the tool holder on the shaft.

2. An adapter for fixing a tool to a rotatable hollow spindle having an end flange integral with and of larger diameter than the spindle, the adapter comprising a collar having a recessed end adapted to be received over the end flange of the spindle, means to secure the collar to the spindle, a shaft rigidly attached to the collar extending outwardly therefrom and coaxial therewith, the shaft having an outwardly facing circular end, reinforcing ribs rigidly connecting the collar and the shaft, a tool holder having a cylindrically-shaped recess to receive the outer end of the shaft, means forming a shoulder at the inner end of the recess in the tool holder providing bearing means for the end of the shaft, the shoulder of a predetermined thickness to determine the distance of axial extension of the tool carrier relative to the position of the cylindrical shaft, the tool holder having an aperture to receive a tool, the aperture directed diagonally inward from an outer corner thereof towards the recess, and securing means mounted on the tool holder for lateral movement with respect thereto for quickly securing and disengaging the tool holder on the shaft.

3. An adapter for fixing a tool to a rotatable hollow spindle having an end flange integral with and of larger diameter than the spindle, the adapter comprising a collar having a recessed end adapted to be received over the end flange of the spindle, means to secure the collar to the spindle, a shaft rigidly attached to the collar extending outwardly therefrom and coaxial therewith, the shaft having an outwardly facing circular end, reinforcing ribs rigidly connecting the collar and the shaft, a tool holder having a cylindrically-shaped recess to receive the outer end of the shaft, means forming a shoulder at the inner end of the recess in the tool holder providing bearing means for the end of the shaft, the shoulder of a predetermined thickness to determine the distance of axial extension of the tool carrier relative to the position of the cylindrical shaft, the tool holder having a transverse guideway extending across the outer end thereof to receive a slide member with a cutting member, and securing means mounted on the tool holder for lateral movement with respect thereto for quickly securing and disengaging the tool holder on the shaft.

4. An adapter for fixing a tool to a rotatable member and adapted to be attached over the end thereof, the adapter comprising a collar having a recess to receive the end of the rotatable member, means rigidly attaching the collar to the rotatable member, a shaft rigidly attached to the collar and extending outwardly therefrom and coaxial therewith, the shaft having an outwardly facing free circular end face, a tool holder having a cylindrically-shaped recess to receive the outer end of the shaft, tool guide means for the tool holder, means forming a shoulder between the tool guide means and the inner end of the recess for cooperation with the free circular end face to determine the axial distance of the tool holder from the shaft, and securing means mounted on the tool holder for quickly securing and disengaging the tool holder from the shaft.

5. An adapter for fixing a tool to a rotatable member and to be attached thereto, the adapter comprising a collar, means to attach the collar to the rotatable member, a shaft at one end rigidly connected with the collar and positioned coaxially therewith, the shaft at its other end having a free end face, a tool holder having a recess to receive the shaft, tool guide means for the tool holder, a stop in the tool holder recess for cooperation with the end of the shaft to determine the axial position of the tool holder with respect to the shaft, and securing means for quickly securing and disengaging the tool holder from the shaft.

References Cited in the file of this patent
UNITED STATES PATENTS

| | | |
|---|---|---|
| 963,559 | Hines | July 5, 1910 |
| 1,485,937 | Raab | Mar. 4, 1924 |
| 2,305,737 | Richards | Dec. 22, 1942 |
| 2,361,324 | Severson | Oct. 24, 1944 |
| 2,381,806 | Clark | Aug. 7, 1945 |
| 2,392,809 | Cote | Jan. 15, 1946 |
| 2,643,556 | Briney | June 30, 1953 |